United States Patent [19]

Hirsch et al.

[11] Patent Number: 4,539,188
[45] Date of Patent: Sep. 3, 1985

[54] PROCESS OF AFTERBURNING AND PURIFYING PROCESS EXHAUST GASES

[75] Inventors: Martin Hirsch, Friedrichsdorf; Wolfram Schnabel, Idstein; Harald Sauer; Hans-Werner Schmidt, both of Frankfurt am Main, all of Fed. Rep. of Germany

[73] Assignee: Metallgesellschaft Aktiengesellschaft, Frankfurt, Fed. Rep. of Germany

[21] Appl. No.: 584,913

[22] Filed: Feb. 29, 1984

[30] Foreign Application Priority Data

Mar. 5, 1983 [DE] Fed. Rep. of Germany ....... 3307848

[51] Int. Cl.$^3$ ............................................. B01D 53/34
[52] U.S. Cl. ................................... 423/210; 423/224; 423/230; 423/240; 423/244
[58] Field of Search ........... 423/210, 224, 230, 244 A, 423/240

[56] References Cited

U.S. PATENT DOCUMENTS 4,233,276  11/1980  D'Souza et al. .................... 423/244
4,346,064  8/1982  Leon .................................. 423/244

Primary Examiner—Earl C. Thomas
Attorney, Agent, or Firm—Felfe & Lynch

[57] ABSTRACT

A process for afterburning and purifying process exhaust gases, which contain combustible constituents, wherein the process exhaust gases and the oxygen-containing gases required for a combustion are separately supplied to a fluidized bed reactor of a circulating fluidized bed. In the fluidized bed reactor, the gas velocity is adjusted to 2 to 10 m/s (empty pipe velocity), the mean suspension density is adjusted to 0.1 to 10 kg/m$^3$, the temperature is adjusted to 700° to 1100° C., and the stoichiometric ratio of gas-purifying agent having a particle size $d_p$ 50 of 30 to 200 μm to pollutant contained in the process exhaust gas or formed by the combustion is adjusted to 1.2 to 3.0, calculated as Ca:S. The entrained solids in the gases from the fluidized-bed reactor are recycled to the reactor at a rate of at least 5 times the weight of solids contained in the fluidized bed reactor per hour.

9 Claims, 2 Drawing Figures

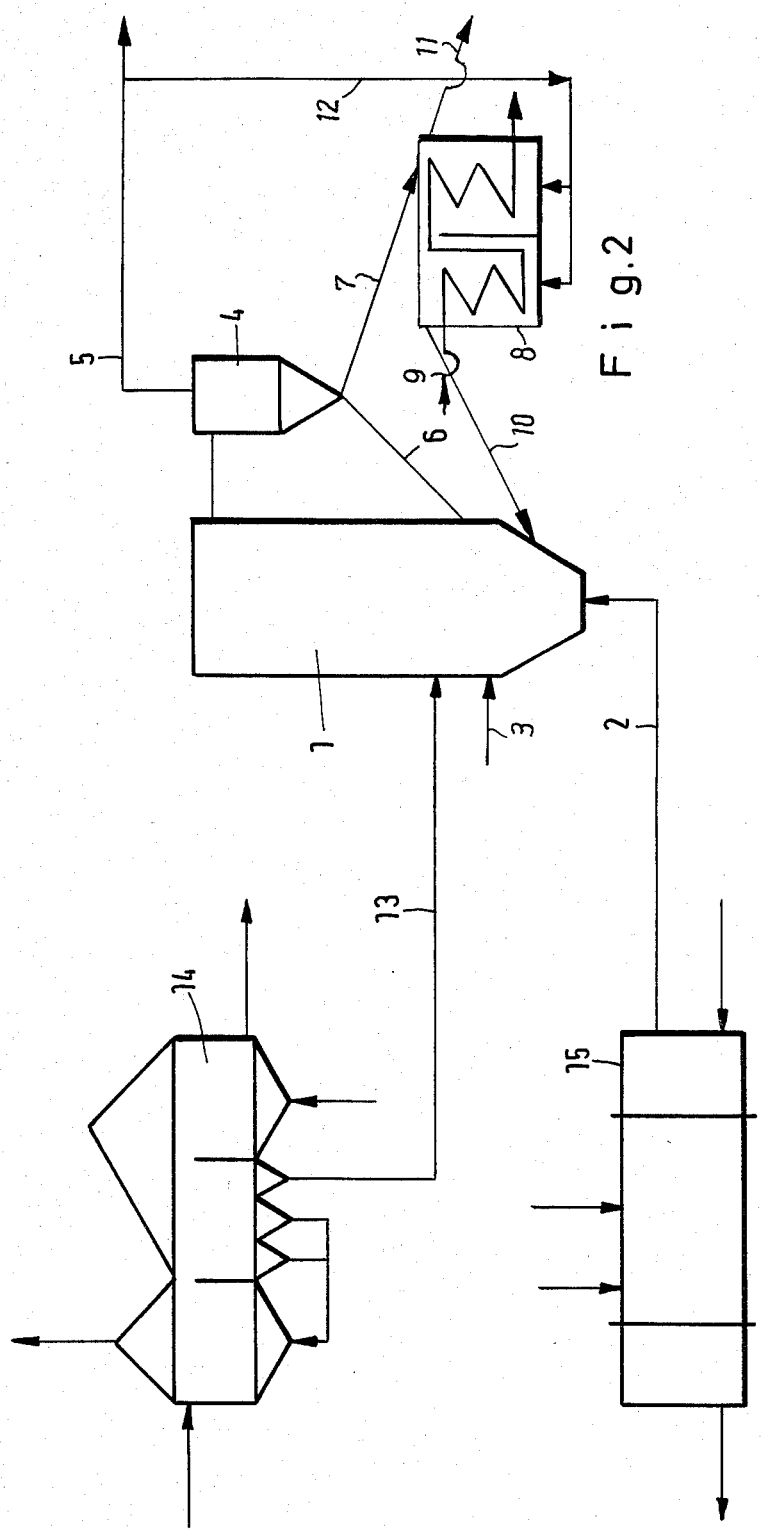

PROCESS OF AFTERBURNING AND PURIFYING PROCESS EXHAUST GASES

BACKGROUND OF THE INVENTION

This invention relates to a process of afterburning and purifying process exhaust gases which contain combustible constituents.

In various processes, e.g., in metallurgical processes carried out in rotary kilns, for instance, in the magnetizing roasting of iron ores and particularly in the direct reduction of iron ores to form sponge iron, exhaust gases which contain combustible constituents are generated. Depending on the process, the combustible constituents consist mainly of CO, $H_2$, hydrocarbons and of solid carbon (carbon black) or dust, which is entrained by the gases, e.g., in the form of iron oxide. The contents of combustible constituents will be relatively high if coal has been used which has a relatively high content of volatile constituents. The combustible constituents must be afterburnt and the dusts and pollutants must be removed from the exhaust gas to avoid pollution.

It is known from U.S. Pat. No. 2,112,566 that the entire exhaust gas from a rotary kiln or a partial stream of such exhaust gas can be completely afterburnt by an addition of air in a single stage and the exhaust gas or a partial stream thereof can then be passed through a bed of solids on a traveling grate. By the complete afterburning in a single stage the temperature of the gas is increased to such a high level that the refractory lining of the afterburning chamber is subjected to strong thermal attack and that the melting or softening point of the fine dust is reached resulting in formation of deposits.

It is known from German Patent Specification No. 20 01 563 that the gas outlet end of a rotary kiln can be directly succeeded by an exhaust gas passage, which is cooled by a tubular wall and opens into the radiant heating chamber of a waste heat boiler. Immediately before the radiant heating section, oxygen-containing gases are supplied, which cause a complete afterburning to be performed. A partial stream of the completely afterburnt gas is withdrawn from the waste heat boiler, after it has been cooled to a temperature below the caking temperature of the entrained solids, and is used to heat the charge of a traveling grate. Whereas a formation of deposits can be avoided to a large extent by that practice, a directly succeeding waste heat boiler is required, which involves a considerable expenditure. Besides, laminar flow in the radiant heating section must be maintained to insure that softened solids cannot reach the wall and form deposits thereon.

SUMMARY OF THE INVENTION

It is an object of the invention to provide for the afterburning and purification of process exhaust gases, a process in which the disadvantages of the known processes, particularly those mentioned hereinbefore, are avoided and which can be carried out without a need in particular for an equipment expenditure which is higher than that involved in the conventional processes.

In a process of the kind described first hereinbefore that object is accomplished in accordance with the invention in that the process exhaust gases and the oxygen-containing gases required for a combustion are separately supplied to a fluidized bed reactor of a circulating fluidized bed, in which combustion and purification of the exhaust gases are effected at a gas velocity of 2 to 10 meters per second (empty pipe velocity) in the presence of solids which contain a gas-purifying agent and have a particle size $d_p$ 50 of 30 to 200 μm and with an adjusted mean suspension density of 0.1 to 10 kg/m$^3$ and at a temperature of 700° to 1100° C., a stoichiometric ratio of 1.2 to 3.0 (calculated as Ca:S) of gas-purifying agent to pollutant contained in the exhaust gas from the process or formed by the combustion is adjusted and the solids entrained by the gases from the fluidized-bed reactor are recycled to the fluidized bed reactor in such a manner that the quantity of solids circulated per hour in the circulating fluidized bed is at least 5 times the weight of solids contained in the fluidized bed reactor.

The above-mentioned gas velocity of 2 to 10 meters per second is defined as the so called empty-pipe velocity and relates to the velocity in a fluidized bed reactor which contains no solids.

From a "classical" fluidized bed, in which a dense phase is separated by a distinct density step from the overlying gas space, the fluidized bed used in accordance with the invention differs in that it contains states of distribution without a defined boundary layer. There is no density step between a dense phase and an overlying gas space but the solids concentration in the reactor decreases continuously from bottom to top.

When the operating conditions are defined with the aid of the Froude and Archimedes numbers, the following ranges are obtained:

$$0.1 \leq 3/4 \times F_r^2 \times \frac{\rho_g}{\rho_k - \rho_g} \leq 10$$

or $0.01 \leq Ar \leq 100$ wherein $$Ar = \frac{d_k^3 \times g(\rho_k - \rho_q)}{\rho_g \times v^2} \text{ and}$$

$$F_r^2 = \frac{u^2}{g \times d_k}$$

u = Relative gas velocity in m/s
Ar = Archimedes number
$F_r$ = Froude number
$\rho_g$ = Density of gas in kg/m$^3$
$\rho_k$ = Density of solid particle in kg/m$^3$
$d_k$ = Diameter of spherical particle in m
$v$ = Kinematic viscosity in m$^2$/s
g = Acceleration due to gracity in m/s$^2$ According to the process of the invention, the combined combustion and purification of the gas can be carried out at high gas throughput rates and at a very constant temperature. The constant temperature which can be maintained has a favorable influence regarding the gas-purifying agents used to purify the gas because these agents retain their activity, i.e., their capacity to take up pollutants. This advantage is supplemented by the fact that the gas-purifying agents have a small particle size because the ratio of surface area to volume is particularly favorable for the rate at which the pollutants are combined, that rate depends particularly on the diffusion rate. Owing to the small particle size of all solids, a fast and uniform temperature distribution in the circulating fluidized bed is ensured.

The pollutants consist particularly of sulfur compounds, such as hydrogen sulfide or sulfur dioxide, which are introduced with the energy carriers, such as fuel oil or coal, from which the process exhaust gases have been derived. The pollutants may also comprise minor quantities of hydrogen chloride or hydrogen fluoride where, e.g., waste tires are also used as energy carriers.

The process exhaust gases and the oxygen-containing combustion gases are supplied to the fluidized bed reactor at different points. The process exhaust gas may be supplied as fluidizing gas and the oxygen-containing combustion gas may be supplied in a plane which is above the inlet for the process exhaust gas. The oxygen-containing combustion gas may be supplied through a plurality of gas lances, which are connected by an annular manifold. The oxygen-containing combustion gas may be supplied, e.g., in two planes.

In another embodiment the oxygen-containing combustion gases are used as fluidizing gas and the process exhaust gases are supplied in at least one plane which is above the inlet for the oxygen-containing combustion gases and in a manner which is analogous to that described hereinbefore.

The solids contained in the circulating fluidized bed may consist only of gas-purifying agents. Depending on the sources of the process exhaust gases and of the oxygen-containing combustion gases, the solids may also contain substantial quantities of dusts which have been supplied by the gases. However, the purification agents shall not be less than 10% by weight of the solids.

The gas-purifying agent may particularly consist of limestone and dolomite. In proportioning in accordance with the above-mentioned stoichiometric ratios it should be borne in mind that where, e.g., dolomite is used, the pollutants, particularly the sulfur compounds, will react virtually only with the calcium carbonate component and the stoichiometric ratio of 1.2 to 3.0 must be based only on the calcuim content.

The fluidized bed reactor used to carry out the process according to the invention may be rectangular, square or circular in cross-section. The lower portion of the fluidized bed reactor may be conical, and such design will be particularly desirable in reactors which are large in cross-section so that the gas throughputs are large too. It will be particularly desirable to supply the fluidizing gases consisting either of the process exhaust gases or of the oxygen-containing combustion gases to the fluidized bed reactor through an inlet device which is similar to a venturi nozzle. If one of the gases contains dust, it is preferably supplied as fluidizing gas.

The gas-purifying agent is supplied to the fluidized bed reactor in a conventional manner, most suitably through one or more lances, e.g., by a pneumatic blowing operation. A relatively small number of lances will be sufficient because the circulating fluidized bed involves an effective transverse mixing.

Particularly desirable operating conditions will be achieved if the rates of process exhaust gas and oxygen-containing combustion gas are so proportioned that the resulting flue gas has in the fluidized bed reactor a velocity of 4 to 8 meters per second and a mean suspension density of 0.2 to 2 kg/m$^3$ is obtained in the fluidized bed reactor.

In an advantageous embodiment of the invention, the gas entrained solids leaving the fluidized bed reactor are recycled to the reactor in such a manner that the quantity of solids circulated per hour in the circulating fluidized bed is at least one hundred times the weight of the solids contained in the fluidized bed reactor. That practice affords the advantage that the fluidized bed reactor can be operated with a very small pressure drop.

Optimum conditions for the purification of the gas will be obtained if, in accordance with a further feature of the invention, a temperature of 800° to 1050° C. is maintained in the circulating fluidized bed.

If the process exhaust gases which are to be burnt and to be purified become available at such a temperature that the flue gases produced by the afterburning of such exhaust gases would have a temperature in excess of 1100° C., a cooling of the fluidized bed will be required. The cooling may be most simply effected by an injection of water into the fluidized bed reactor.

In accordance with a preferred feature of the invention, however, the temperature of the circulating fluidized bed is adjusted by a supply of solids which have been cooled in a fluidized bed cooler. For this purpose solids are withdrawn from the cycle consisting of the fluidized bed reactor, recycling cyclone and return line and said solids are cooled in a fluidized bed cooler, which preferably comprises a plurality of cooling chambers with interconnected immersed cooling registers, which the solids pass through in succession. The coolant and the solids are flowing countercurrently and the cooled solids are subsequently returned to the above-mentioned cycle. The heat which is extracted by the cooling is preferably used to generate process heat, e.g., in the form of steam or of heated heat-carrying salts or oils.

The process exhaust gases which are supplied to the process according to the invention and contain combustible constituents have usually a low calorific value of, e.g., up to 4000 kJ/m$^3$N where m$^3_N$ is the abbreviation of cubic meter at standard temperature and pressure. The gases may be laden with dust or carbon black. Such process exhaust gases may become available, e.g., in direct reducing processes using solid carbonaceous materials, or may consist of flare gases from refineries or oil wells.

If the process exhaust gases have become available in a solids reduction process, another feature of the invention resides in that the exhaust gases from a pellet-firing machine, or a sintering plant usually provided at the same location are used as oxygen-containing combustion gases. If only a partial stream of the exhaust gas can be used for that purpose, it is desirable to use that part which has the highest pollutant content. In that case a separate step to remove pollutants from that exhaust gas stream will not be required.

According to a preferred embodiment of the invention, the oxygen-containing combustion gas is supplied at such a rate that the resulting flue gas contains 2 to 10% of oxygen by volume. This will result in an optimum elimination of pollutants and a high degree of utilization of the gas-purifying agent. Besides, a high degree of sulfatization can be achieved when limestone or dolomite is used as a gas-purifying agent.

The main advantages afforded by the process according to the invention reside in that the combustion and purification of the process exhaust gases can be effected in one apparatus and that the combustion can be performed satisfactorily even when the gas has only a low content of combustible constituents, i.e., under conditions under which conventional afterburners cannot be operated or can be operated only with difficulty. In preferred embodiments of the invention, exhaust gases from other apparatus can be processed too so that the need for a separate treatment is eliminated, and the low-quality energy contained in the process exhaust gases can also be utilized.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 2 is a schematic of a combined system comprising equipment in which process exhaust gases from a solids reduction process are afterburnt and pollutants removed from said gases, and a pellet-firing machine.

DESCRIPTION OF PREFERRED EMBODIMENT

Figure 1:
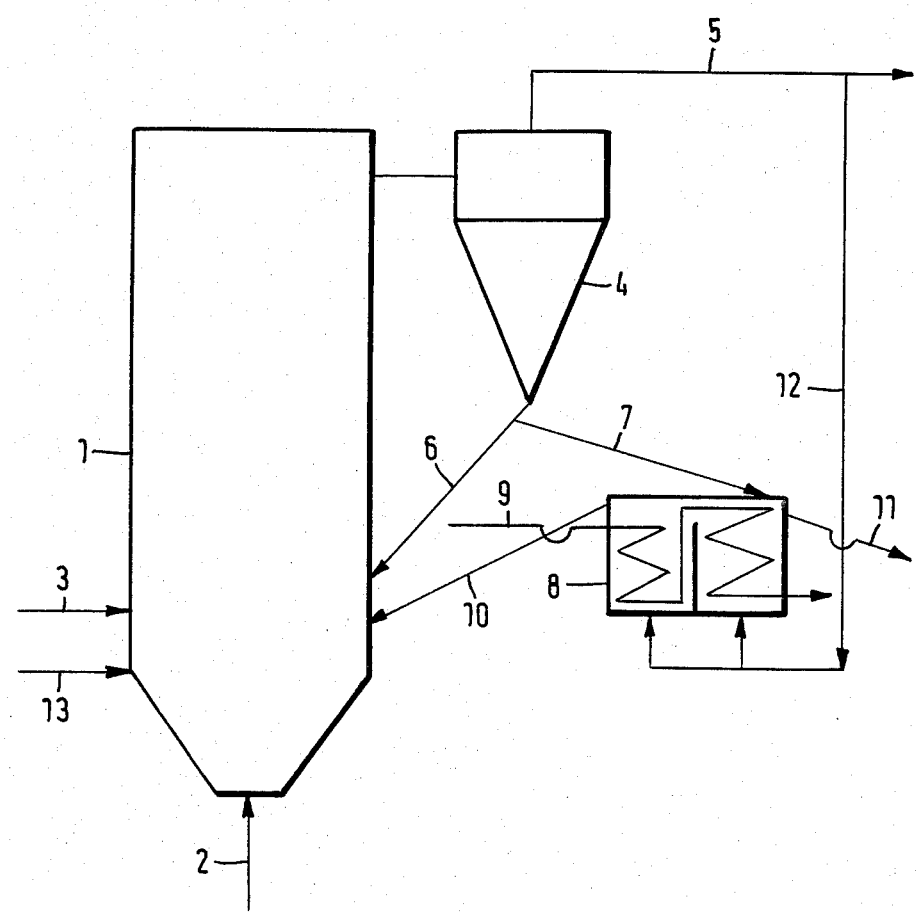
FIG. 1 is a schematic representation of the process in which solids are withdrawn from the cycle and cooled and then returned to the circulating fluidized bed.

The fluidized bed reactor 1 shown in FIG. 1 is supplied with the process exhaust gas through line 2 and with the gas-purifying agent through line 3. Oxygen-containing combustion gas is supplied through line 13. A gas-solids suspension is formed within the fluidized bed reactor 1 and occupies the entire interior of the reactor. That suspension is discharged at the top of the reactor and is supplied to a recycling cyclone 4, in which gas and solids are separated. The process exhaust gas which has been burnt and purified leaves the recycling cyclone 4 through line 5.

A portion of the solids is returned to the fluidized-bed reactor 1 through the return line 6, which is equipped with a seal, e.g. of the flap valve type or the U-shaped seal type. Another partial stream is supplied in line 7 to the fluidized-bed cooler 8 and is cooled there with water, which is conducted through cooling registers 9. The cooled partial stream is returned to the fluidized-bed reactor 1 through line 10. Solids at a rate corresponding to the rate at which fresh gas-purifying agent and possibly dust are supplied is withdrawn through line 11. The fluidized-bed cooler 8 is fluidized by means of gas which has been diverted from the flue gas through line 12 and which after having flown through the cooler is returned to the fluidized bed reactor 1 together with the cooled solids.

FIG. 2 shows a pellet-firing machine 14, a solids reduction unit 15 and a circulating fluidized bed system 1, 4, 6, which is similar to that shown in FIG. 1.

The process exhaust gases from the solids reduction process are supplied through line 2 to the fluidized bed reactor 1 and are burnt there with oxygen-containing combustion gas supplied from the pellet-firing machine 14 through line 13. The resulting flue gases are purified at the same time. That partial stream of oxygen-containing gases which has been supplied from the pellet-firing machine 14 contains virtually all pollutants which have been formed by the firing of pellets. The purified flue gases leave the circulating fluidized bed through line 5.

EXAMPLE

In a solids reduction plant 15 for producing sponge iron, process exhaust gas became available at a rate of 67,000 $m^3{}_N$ per hour. That process exhaust gas had the following composition in percent by volume:

CO—2.3
H$_2$—1.1
CO$_2$—18.3
H$_2$O—14.3
N$_2$—63.9
SO$_2$—0.1 and was at a temperature of 850° C. Its dust content (iron oxide and ash) amounted to 25 g/$m^3{}_N$ and its carbon black content to 12 g/$m^3{}_N$.

The process exhaust gas was supplied to the fluidized bed reactor 1 through the line 2 and an inlet device similar to a venturi nozzle. An exhaust gas from the firing zone of a pellet-firing machine 14 was supplied at a rate of 40,000 $m^3{}_N$/h and at 380° C. to the fluidized bed reactor 1 through line 13 at the same time. That combustion gas had the following composition in percent by volume:

O$_2$—19.0
CO$_2$—1.5 H$_2$O—2.5 N$_2$—77.0

That gas had an SO$_2$ content of about 0.05% by volume.

The gas-purifying agent consisted of limestone having a particle size $d_p$ 50=100 μm and was supplied at a rate of 1100 kg/h so that the stoichiometric ratio calculated as Ca:S amounted to about 2.5.

To maintain in the fluidized bed reactor 1 a temperature of 850° C., solids at a rate of 50 metric tons per hour were circulated through the line 7, the fluidized bed cooler 8 and the line 10 and were cooled in the fluidized bed cooler 8 from 850° C. to 400° C. Saturated steam at 30 bars was generated at a rate of 9.6 metric tons per hour in the cooling registers 9, which were fed with feed water at 105° C.

Under the selected conditions, a solids circulation rate of 220 per hour was obtained in the cycle consisting of the fluidized-bed reactor 1, the separator 4 and the return line 6 and a mean suspension density of 1 kg/$m^3$. A gas velocity of 6 m/s were obtained in the fluidized-bed reactor 1.

The resulting flue gas obtained at a rate of 105,000 $m^3{}_N$/h had the following composition in percent by volume:

O$_2$—4.8
N$_2$—70.0
CO$_2$—15.1
H$_2$O—10.1

The residual SO$_2$ content of the flue gas amounted to 95 mg/$m^3{}_N$. This corresponds to a removal of 97% of the sulfur.

It will be understood that the specification and examples are illustrative but not limitative of the present invention and that other embodiments within the spirit and scope of the invention will suggest themselves to those skilled in the art.

We claim:

1. A process for afterburning and purification of process exhaust gases which contain combustible constituents consisting mainly of CO, H$_2$, hydrocarbons and of solid carbon (carbon black) and pollutants consisting mainly of sulfur compounds, comprising separately supplying the process exhaust gases and an oxygen-containing gas to a fluidized bed reactor of a circulating fluidized bed, wherein combustion and purification of the exhaust gases are effected at a temperature of 700° to 1100° C., at a gas velocity of 2 to 10 meters per second (empty pipe velocity) in the presence of solids, said solids containing a gas-purifying agent consisting of lime, limestone and/or dolomite having a particle size $d_p$ 50 of 30 to 200 μm, and at solids/gas suspension conditions having an adjusted mean suspension density of 0.1 to 10 kg/$m^3$, adjusting the stoichiometric ratio of gas-purifying agent to pollutant contained in the exhaust gas from the process or formed by the combustion to 1.2 to 3.0 (calculated as Ca:S) and recycling the solids entrained by the gases from the fluidized-bed reactor to the fluidized bed reactor in such a manner that the quantity of solids circulated per hour in the circulating fluidized bed is at least 5 times the weight of solids contained in the fluidized bed reactor.

2. The process according to claim 1, wherein the process exhaust gases are combusted and purified in the fluidized bed reactor at a gas velocity of 4 to 8 m/s.

3. The process according to claim 1, wherein a mean suspension density of 0.2 to 2 kg/m$^3$ is adjusted in the fluidized bed reactor.

4. The process according to claim 1, wherein the entrained solids leaving the fluidized bed reactor are recycled to the reactor in such a manner that the quantity of solids circulated per hour in the circulating fluidized bed is at least one hundred times the weight of the solids contained in the fluidized bed reactor.

5. The process according to claim 1, wherein a temperature of 800° to 1050° C. is maintained in the circulating fluidized bed.

6. The process according to claim 5, wherein the temperature in the fluidized bed reactor is maintained by introduction of externally cooled solids.

7. The process according to claim 6, wherein the solids are cooled in a fluidized bed cooler.

8. The process according to claim 1, wherein exhaust gas from a pellet-firing machine or a sintering plant, preferably from a region having a high SO$_2$ concentration, is used as the oxygen-containing gas.

9. The process according to claim 1, wherein the oxygen-containing gas is supplied at such a rate that resulting flue gas has an oxygen-content of 2 to 10% by volume.

* * * * *